C. B. BROWN.
Mower.
No. 951. Reissued May 1, 1860.
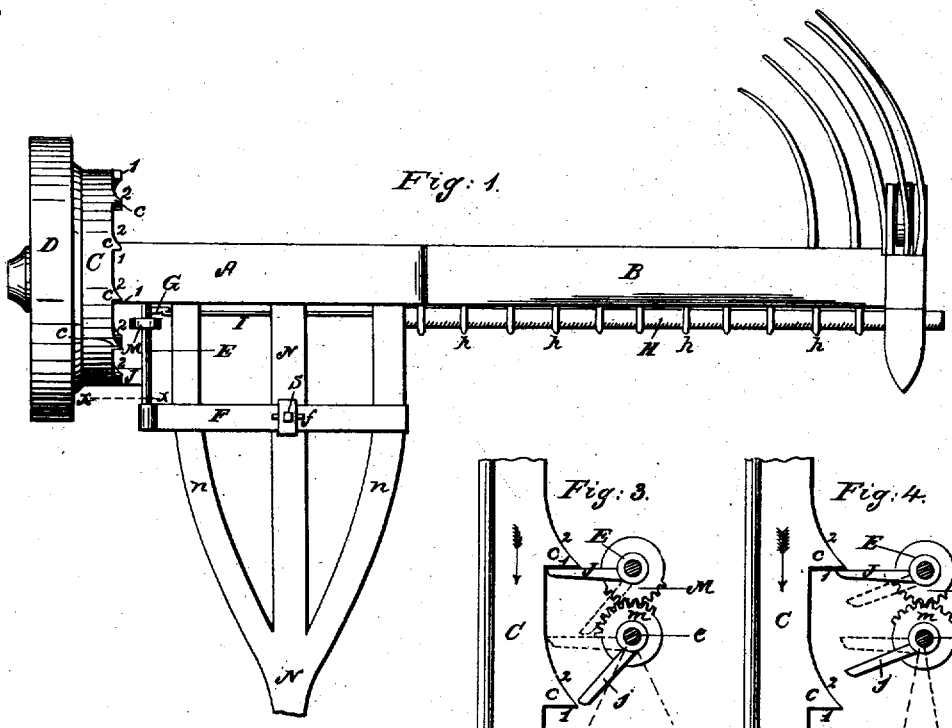
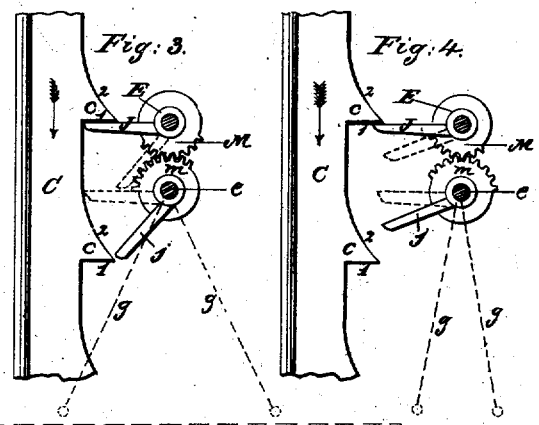
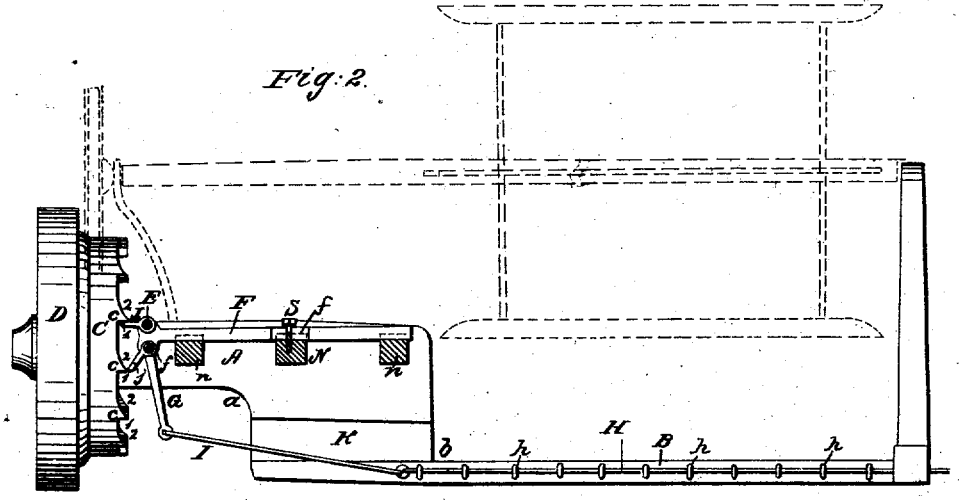
N. PETERS. Photo-Lithographer, Washington, D. C.

UNITED STATES PATENT OFFICE.

C. AULTMAN & CO., OF CANTON, OHIO, ASSIGNEES OF C. B. BROWN, OF GRIGGSVILLE, ILLINOIS.

IMPROVEMENT IN GRAIN AND GRASS HARVESTERS.

Specification forming part of Letters Patent No. 9,446, dated December 7, 1852; Reissue No. 951, dated May 1, 1860.

*To all whom it may concern:*

Be it known that COLLINS B. BROWN, formerly of Griggsville, in the county of Pike and State of Illinois, now of Alton, in the county of Madison, in the same State, did invent certain new and useful Improvements in Reaping and Mowing Machines, of which the following is a full, clear, and exact description, reference being had to the accompanying drawings, which make part of this specification, and in which—

Figure 1 represents a plan of the machine adapted to mowing, and with a track-clearer attached, but without any reel or reel-support. Fig. 2 represents an elevation of the front of the machine with a reel and one of the reel-supports shown in dotted lines, but without a track-clearer. Fig. 3 represents a section taken at the line *x x* of Fig. 1, to show upon an enlarged scale the relation to each other of the tappets of the wheel C, the pallets J and *j* of the rock-shafts E and *e*, and their gearing M *m*; and Fig. 4 represents the same parts as Fig. 3, but with the pallets adjusted to a greater distance from the tappet-wheel to give less motion to the cutter than the adjustment shown in Fig. 3, which is adapted to giving it a maximum motion.

That side of the machine at which the driving-wheel is placed is called the "right" side, and the opposite side is called the "left" side, of the machine.

The improvement of the said BROWN which is the subject of this patent consists of a new construction and arrangement of the frame whereby a single bent main beam is made to perform the duty of finger-beam, axle for the main driving-wheel, and support for the rear end of the tongue and for the greater part of the gearing, thus simplifying the machine and rendering it compact and strong.

The said improvement further consists in varying the bend of the main beam to vary the elevation of the cutter by inserting and removing, as required, a short section between the elbows of the bend; and the said improvement consists further in a new device for imparting a reciprocating movement to the cutter, consisting of a tappet-wheel, a pair of pallets connected by gearing, and a vibrating arm and link-rod, or the equivalent thereof, for communicating motion from the pallets to the cutter.

It is not deemed necessary to describe in this specification more of the machine than is required to explain the invention claimed under this patent, as the other parts of the machine are fully described in other divisions of the original patent of which this is a reissue and one division.

In the accompanying drawings the main beam A K B of the machine in plan is straight, as seen in Fig. 1. In elevation it is crooked, having a double elbow, as seen in Fig. 2. The purpose of the double elbow is to place the short end A of the beam at the proper elevation above the ground to adapt it to perform the duty of axle for the driving-wheel D, of a support for the rear end of the tongue, N, by which the machine is drawn, and likewise of a support for the gearing by which motion is transmitted to the cutter, and while the elbow permits the short end A of the main beam to be thus placed, it also permits the long end B of the beam to occupy the proper position near the ground to perform the duty of a finger-beam. The piece K, interposed between the overlapping ends of the short and long horizontal parts A and B of the beam, lengthens the vertical arm between the upper crook, *a*, and the lower crook, *b*, of the double elbow. By withdrawing the intermediate piece, K, which is readily done, as it is secured in place by screws, and bolting the parts A and B together, the vertical arm will be shortened and the crooks will be brought nearer together to raise the right end of the portion of the main beam that acts as a finger-beam.

Guard-fingers *h* and a vibrating cutter, H, are arranged in the usual manner on the front edge of the finger-beam B.

The tongue N, only the rear portion of which is shown in the drawings, is fastened at its rear end to the upper side of the part A of the main beam, and it is supported on both sides by braces or hounds *n n*. The journal for the hub of the driving-wheel D is formed on the right end of the main beam.

A tappet-wheel, C, is attached to the left side of the driving-wheel. The periphery of the tappet-wheel serves as a pulley to drive the band for turning the reel. The tappets *c* are on the side of the rim of the wheel C, and their acting-faces 1 are at right angles to the plane of the side of the wheel. The backs 2 of the tappets recede in a curve, so as to be out of the way of certain pallets J and *j*, hereinafter described, upon which the tappets act in revolving.

Two rock-shafts, E and *e*, placed one above the other, are supported in suitable bearings, and in a position parallel, or thereabout, to the side of the tappet-wheel. The bearings for the rear ends of these shafts are formed in or attached to the part A of the main beam, and the bearings for the front ends of the shafts are supported by a bar, F, placed across the hounds and tongue. The lower rock-shaft, *e*, is fitted with an arm, G, connected by a link-rod, I, with the right end of the cutter H. This shaft is also fitted with a shorter arm, *j*, which acts as a pallet in connection with the tappets *c*. The upper rock-shaft, E, is also fitted with an arm, J, formed like the short arm *j* of the lower rock-shaft, and, like it, also designed to act as a pallet in connection with the tappets *c*. The two rock-shafts are geared together by means of a toothed sector, M, on the upper and another like sector, *m*, on the lower shaft. The cogged segments of these sectors should be long enough to permit the pallets to vibrate to the extent necessary to give the maximum motion required for the cutter.

The bar F, which carries the front bearings of the rock-shafts, is arranged to slide in grooves across the upper surface of the tongue and hounds, and a slot, *f*, is made in that part of the bar which is over the tongue, through which slot a set-screw, *s*, passes into the tongue. The bar can thus be set nearer to or moved farther from the tappet-wheel, and by means of the screw clamped fast to the tongue and released again at pleasure to adjust the parts as required. The slot *f* must be of sufficient length to permit the bar to move toward and from the tappets far enough to bring the pallets as deeply into gear with the tappets as is required to give the greatest motion to the cutter, or to remove them entirely out of gear with the tappets when it is desired to move the machine without vibrating the cutter—as, for example, when the machine is being drawn to or from the place where its work is to be done.

As the rock-shafts are geared together by the sectors, they must, with their respective arms J, *j*, and G, turn simultaneously in opposite directions, and as these shafts are in succession turned in the same direction by the action of the passing tappets upon the arms or pallets J and *j* successively, it follows that the shafts, with their arms, are moved first in one direction and then in the other to give to the cutter an alternating motion.

The pallets J and *j* are attached firmly to their respective shafts, and may be set in position as follows, viz: One shaft, E, is placed, as in Fig. 3, with its pallet J in a position at right angles to the plane of motion of the tappets, and in contact with and overlapping the acting face of one of the tappets. The other shaft, *e*, is then placed, as seen in the same figure, with its pallet *j* so inclined as to bring its extremity just outside of the plane of motion of the extremities of the tappets, and just free from contact with the face of the tappet immediately preceding the one in contact with the pallet J. In these relative positions of the shafts and their pallets the two cogged sectors M and *m* are geared together, as shown in Fig. 3, and firmly secured to the shafts. This preserves the proper relative positions of the parts and causes one pallet while being moved forward by a tappet to turn the other pallet by means of the shafts and sectors back in the opposite direction into the proper position to be in its turn in like manner moved forward as soon as it is reached by the face of a tappet. For example, the tappet in Fig. 3, just ready to act upon the pallet J and revolving in the direction of the arrow, will cause the free extremity of J to move forward and the corresponding extremity of the pallet *j* to retrograde, or move backward, at the same time until the pallet J reaches the inclined position and the pallet *j* the horizontal position shown by the dotted lines, which indicate the extremities of the forward movement of the pallet J and of the backward movement of the pallet *j*. The tappet will now, after passing the end of the pallet J, immediately bear upon the pallet *j*, and begin to turn it forward to the position shown in black lines, upon reaching which the tappet will pass it, the other pallet, J, having in the meantime been returned into its original horizontal position, ready for the next tappet to move it forward again. When the pallet J is moved forward and the pallet *j* retrogrades, the arm G is swung toward the right, and when the pallet *j* is moved forward and the pallet J retrogrades the arm G is swung toward the left, and it imparts these right and left movements through the link I to the cutter. Each tappet of the series, it will be seen, acts in turn upon the two pallets successively, one of the pallets being ready to receive the action of a tappet after the pallet previously acted upon has been turned out of the range of action of the tappets.

The adjustment of the parts as shown in Fig. 4 will give to the cutter but little motion compared to that given by the adjustment shown in Fig. 3. In Fig. 4 the tappet moves the pallet but a very short distance before it passes it, as is shown by the black and dotted lines. To give more motion to the cutter than could be obtained from the adjustment of the parts shown in Fig. 4, it would only be necessary to slacken the adjusting-screw *s*, to loosen the bar F, withdraw one of the journals of one of the shafts E *e* from its bearings, to disengage the sector *m* from the sector M, change the relative position of the sectors so as to bring the pallets into the required new relative position, as shown in Fig. 3, then re-engage them, reinsert the journal of the shaft E or *e* in its bearing, place the bar F in its guide and move it towards the tappet-wheel the required distance to bring the pallets into the proper position relative to the tappets, and again tighten the screw to hold the parts as adjusted. This would cause the pallets to gear deeper with the tappets and thereby increase the motion of the cutter. Of course the proper degree of motion for the cutter can only be determined by the operator of the machine from his observation of its working and from the changing character of the crops to be cut.

Above the cutter a reel may be placed, as shown in dotted lines in Fig. 2. This reel may be supported by posts placed on or near the opposite ends of the main beam. This reel adapts the machine the better for reaping, for which purpose a platform of the usual construction would be required to carry the grain until a sufficient quantity had been gathered for a sheaf.

For mowing, the reel, its supports, and the platform might be dispensed with, and the left end of the finger-beam fitted with a track-clearer.

What is claimed under this patent as the invention of the said COLLINS B. BROWN is—

1. The bent main beam so constructed as to serve as an axle for the driving-wheel, a finger-beam, and a support for the rear end of the tongue and the greater portion of the gearing, whereby the machine is rendered compact, strong, and simple, substantially as described.

2. Constructing the main beam of a reaper and mower with a variable bend, for the purposes substantially as described.

3. The combination of the pallets J *j*, geared together, and the arm G or its equivalent with the tappet-wheel C or its equivalent, for imparting to the cutter a vibrating motion, substantially as described.

In testimony whereof we have hereunto subscribed our names.

CORNELIUS AULTMAN.
LEWIS MILLER.
T. R. TONNER.
JACOB MILLER.
GEORGE COOK.

Witnesses:
ISAAC HAZLETT,
JAS. TORMES.